(No Model.)
W. H. PREDMORE.
CALF WEANER.
No. 386,266. Patented July 17, 1888.
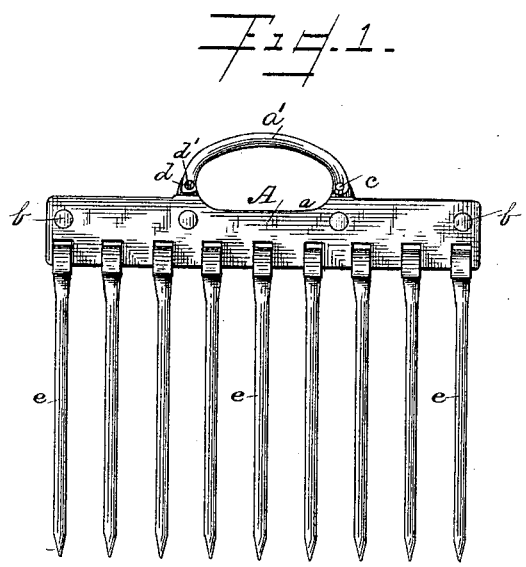
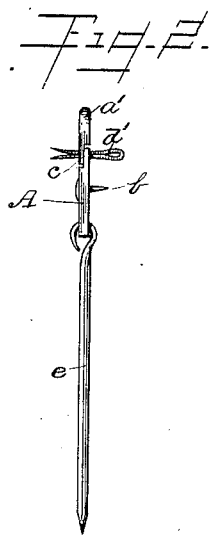
WITNESSES,
Jos. H. Blackwood
Geo. C. Bollinger
INVENTOR,
Wm. H. Predmore
By Patrick O'Farrell,
Attorney.

UNITED STATES PATENT OFFICE.

WILLIAM H. PREDMORE, OF WALWORTH, NEBRASKA.

CALF-WEANER.

SPECIFICATION forming part of Letters Patent No. 386,266, dated July 17, 1888.

Application filed March 14, 1888. Serial No. 267,175. (No model.)

*To all whom it may concern:*

Be it known that I, WILLIAM H. PREDMORE, a citizen of the United States, residing at Walworth, in the county of Custer and State of Nebraska, have invented certain new and useful Improvements in Animal-Muzzles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to certain new and useful improvements in animal-muzzles; and it consists in the peculiar formation and arrangement of the parts, substantially as hereinafter fully set forth and described.

In the accompanying drawings, Figure 1 is a front view of my invention, and Fig. 2 a side view of same.

The object of my invention is to provide an improved muzzle for calves and other animals to prevent them from sucking, and which shall be simple in construction and effective in use.

In carrying out my invention I provide a plate, $a$, of convenient size to extend the full length of the upper lip, and having its upper edge provided with a groove or recess, $a$, to conform to the nose of the animal, by means of which said plate can be brought to a proper height on the animal's lip. The plate $a$ is also provided with a number of sharp projections or barbs, $b$, which normally rest in close proximity to the animal's lip, and by means of which punishment is inflicted to a limited extent on the animal wearing this device when it attempts to obtain its food in the manner which it is the object of this invention to prevent. The propriety and efficacy of this arrangement is apparent, and it will be seen that instead of inflicting punishment or injury upon the animal which the one muzzled is endeavoring to suck, the latter is the one that will receive the punishment, and hence will soon cease in his endeavors. A curved arm, $a'$, is pivoted at $c$ to an upper projection of the plate $a$, and by means of this arm said plate is secured to the animal's nose.

In practice, the free end of this arm is passed through the partition of the nose, which has previously been punched, and fastened to plate $a$ at $d$ by a set-screw, rivet, or split pin, $d'$.

Pendent from plate $a$ and hinged to its lower edge are the rods or bars $e$, of such length as is necessary to extend below the animal's mouth, and close enough together so as not to allow the passage of the teat between them. These rods or bars are attached to plate $a$ by passing one end, which has been flattened, through an opening made in plate $a$ to receive it, and bending the end over to form a hinge, so that said bars are free to swing. By thus attaching the bars too great a space will not be formed when the bars are forced to one side.

By the construction as above set forth a muzzle is provided which is simple and effective, and by making use of the bars above described a free passage of air is secured to the animal wearing this invention.

It is well known that calf-weaners heretofore known and used had mainly for their object the provision of means for inflicting punishment, not on the animal wearing such weaner, but upon the one with which the former comes in contact, thus frequently doing harm to the bag or breast of said animal, whereas in my device when the animal wearing the weaner comes in contact with or endeavors to suck another animal it inflicts slight punishment upon itself by reason of the barbs $b$, and thus the object of the device is at once accomplished.

I claim as my invention—

1. As an improvement in calf-weaners, the plate provided with a series of rods or bars pivotally secured thereto by having their flattened ends passed through holes or apertures of said plate, substantially as shown and described.

2. The combination, with the plate having the rearwardly-projecting barbs, and the rods or bars pivotally secured thereto, of the curved arm pivoted to said plate at one end and removably secured thereto at its other end, substantially as shown and described.

In testimony whereof I affix my signature in presence of two witnesses.

WILLIAM H. PREDMORE.

Witnesses:
A. W. DARLING,
H. G. HALL.